Aug. 19, 1952 P. W. MARTIN 2,607,220
MEANS FOR MEASURING CONDITIONS IN DEEP WELLS
Filed April 14, 1947 5 Sheets-Sheet 2
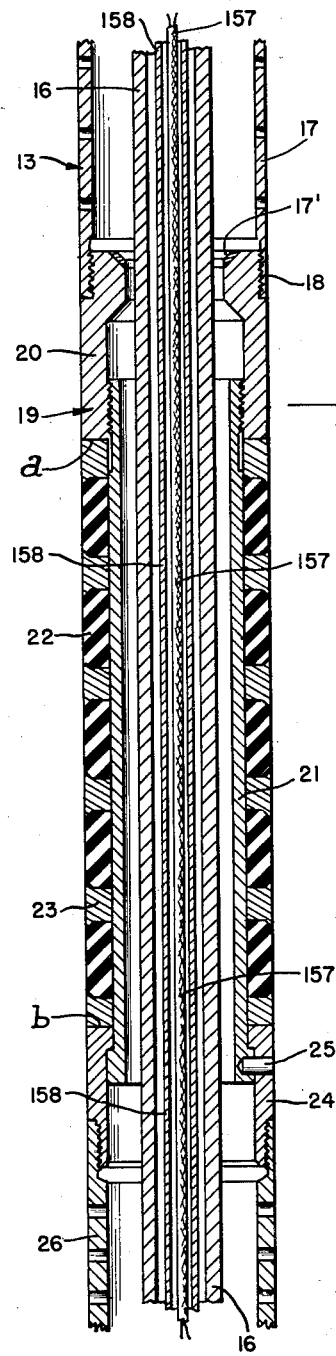
*Fig.3*
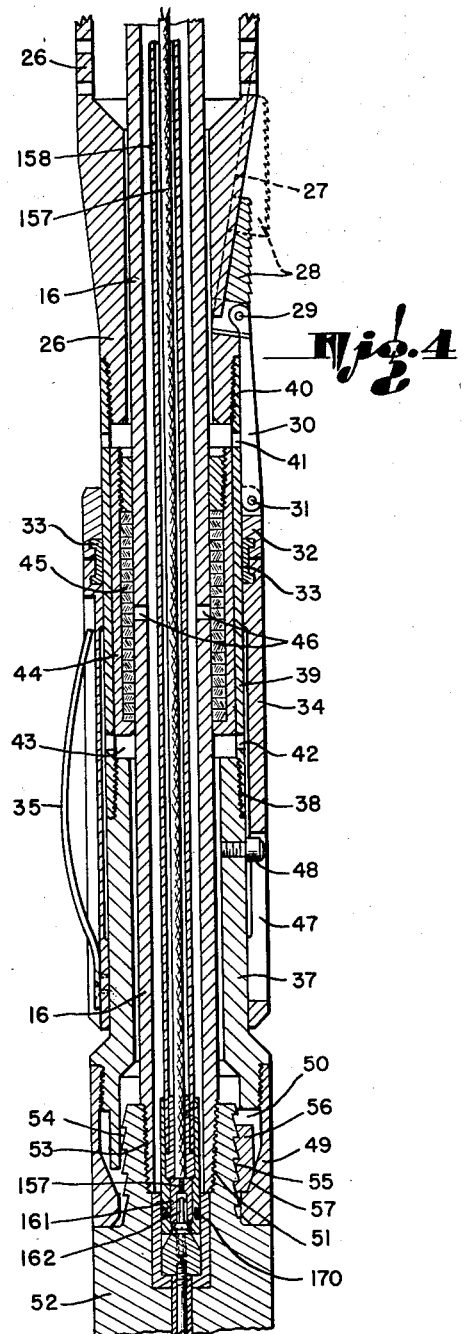
*Fig.4*
INVENTOR.
PHILIP W. MARTIN
BY
ATTORNEY Aug. 19, 1952     P. W. MARTIN     2,607,220
MEANS FOR MEASURING CONDITIONS IN DEEP WELLS
Filed April 14, 1947     5 Sheets-Sheet 3
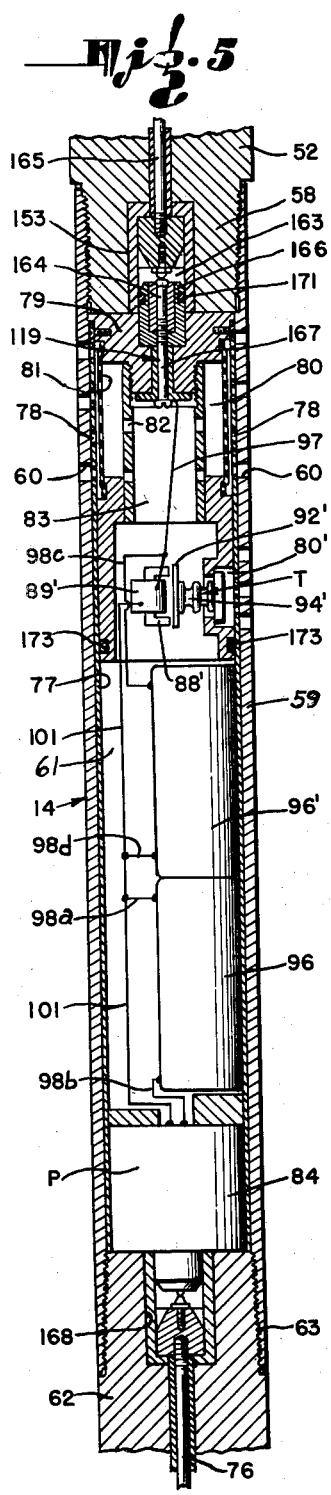
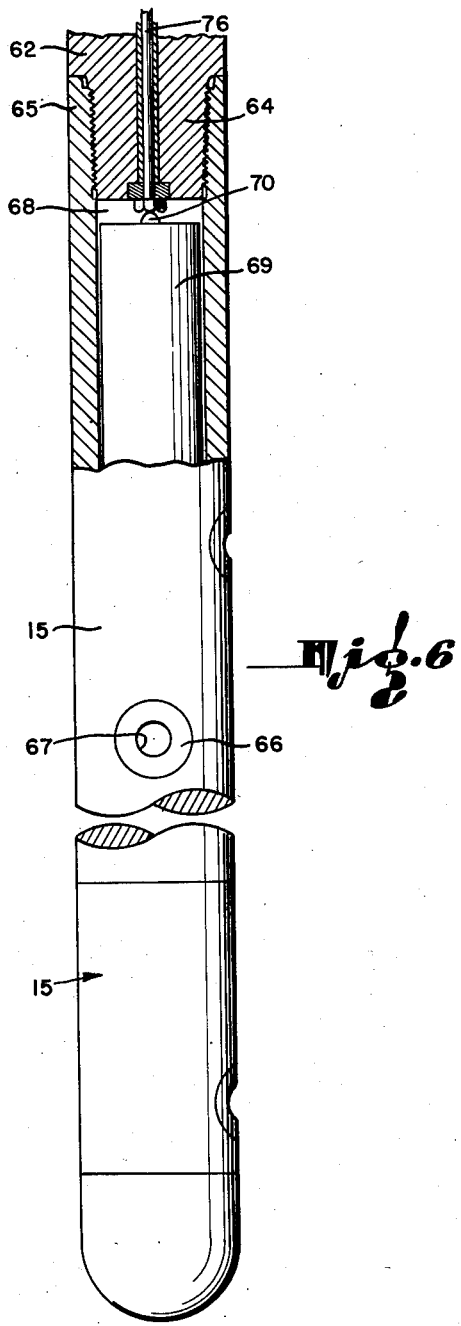
INVENTOR.
PHILIP W. MARTIN
BY
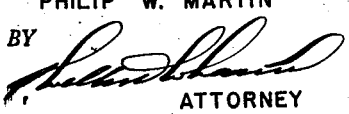
ATTORNEY

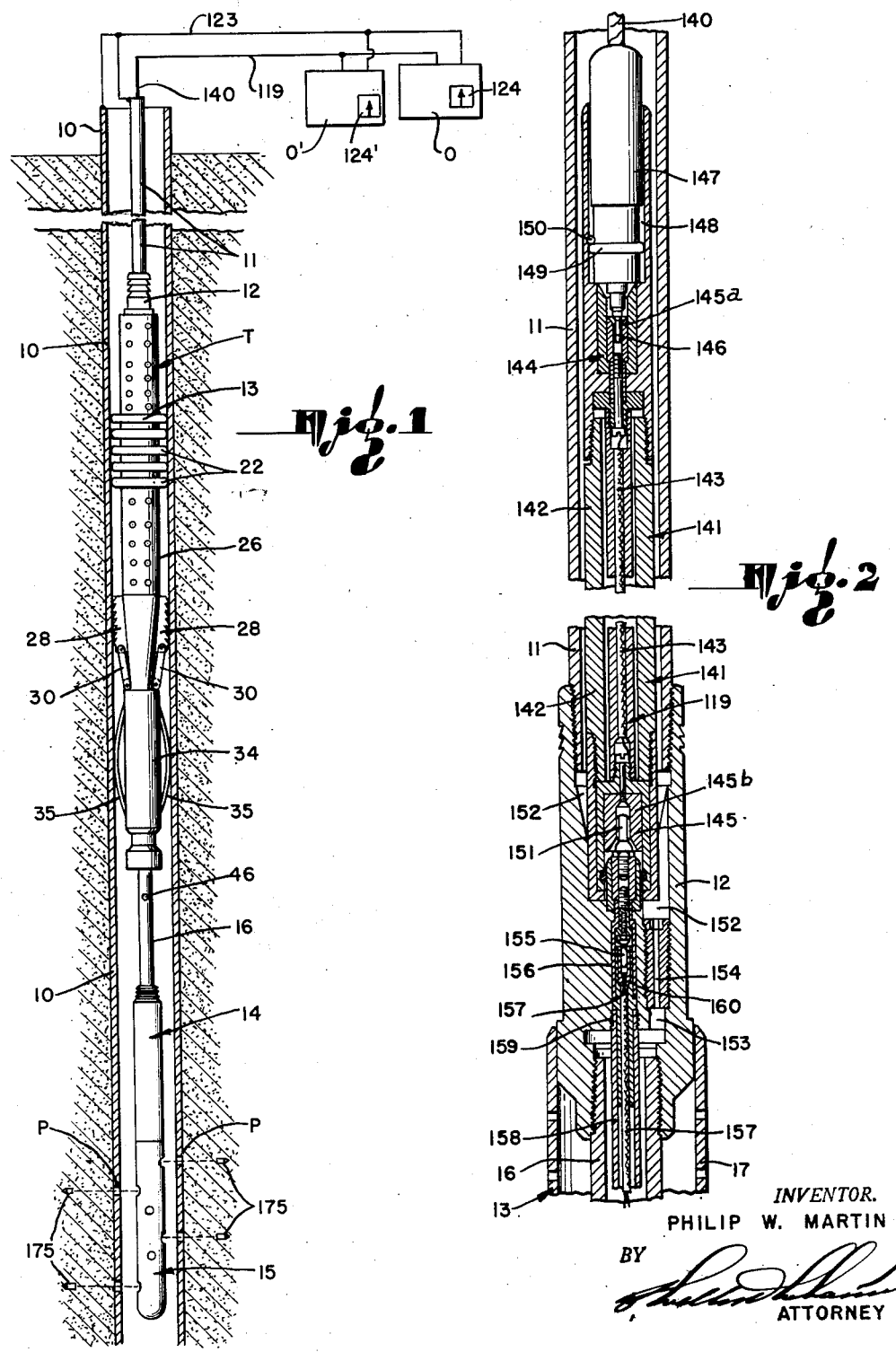

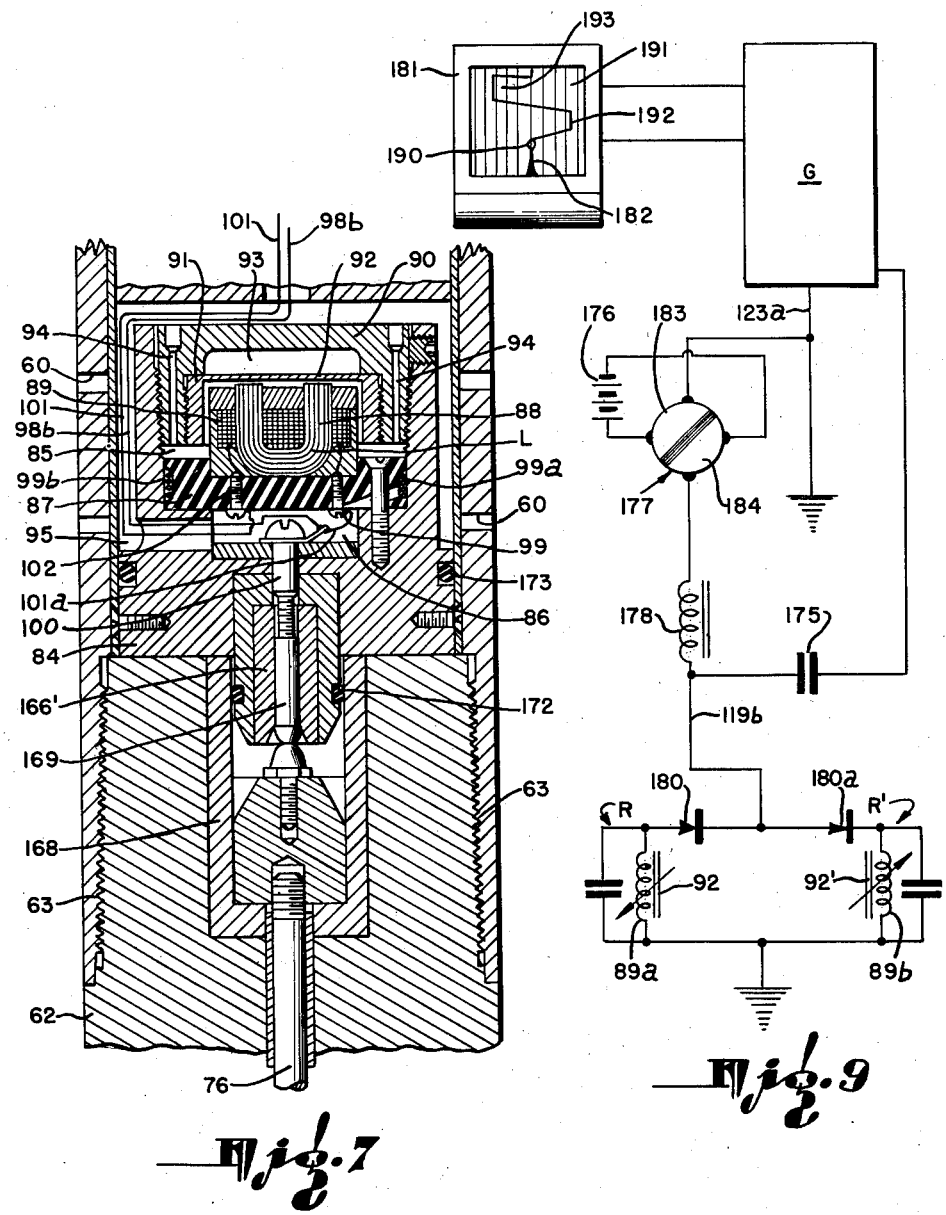

Aug. 19, 1952     P. W. MARTIN     2,607,220
MEANS FOR MEASURING CONDITIONS IN DEEP WELLS
Filed April 14, 1947     5 Sheets-Sheet 5
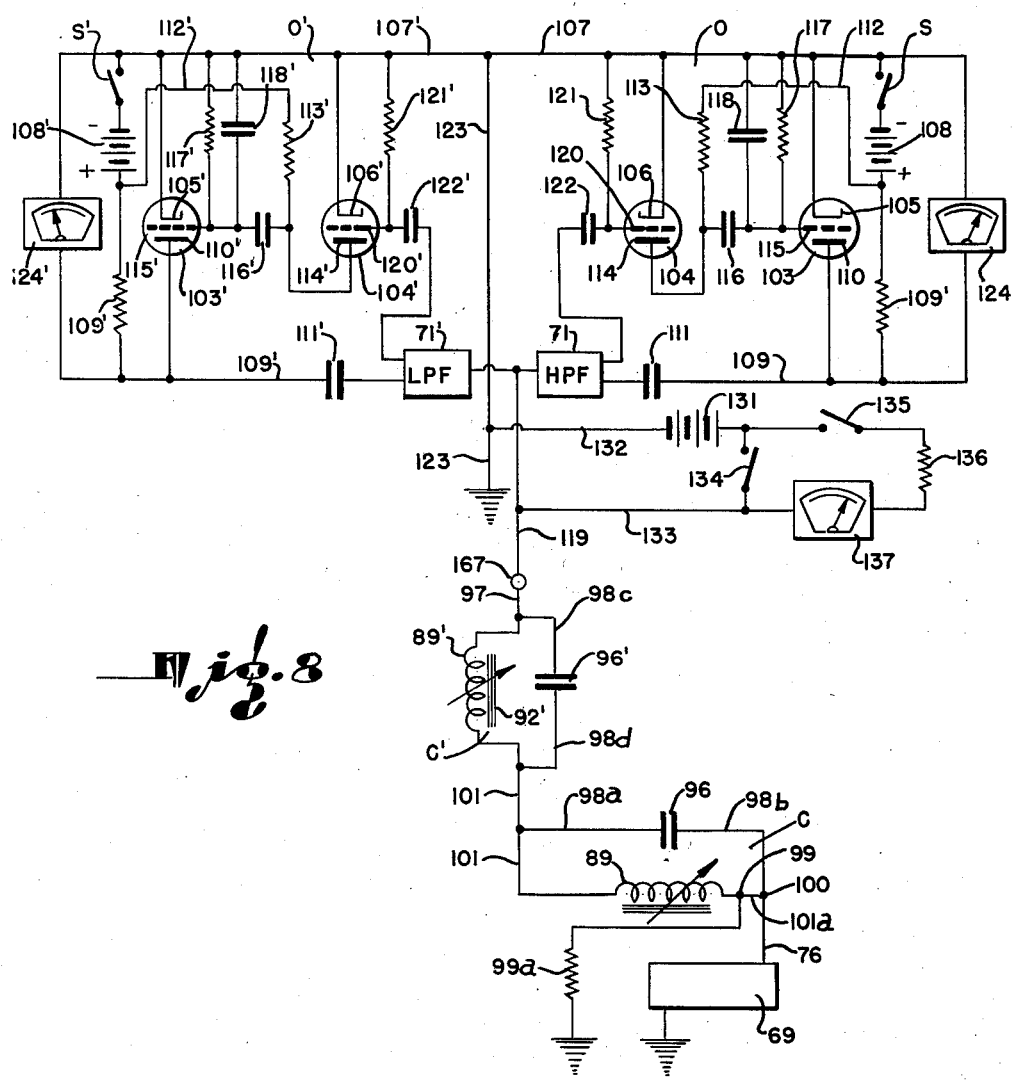
*Fig. 8*
INVENTOR.
PHILIP W. MARTIN
BY
ATTORNEY Patented Aug. 19, 1952

2,607,220

UNITED STATES PATENT OFFICE 2,607,220

MEANS FOR MEASURING CONDITIONS IN DEEP WELLS

Philip W. Martin, Huntington Park, Calif.

Application April 14, 1947, Serial No. 741,212

7 Claims. (Cl. 73—151)

My invention relates to apparatus for measuring conditions in wells, and is particularly useful for measuring pressure and/or temperature.

It is an object of the invention to provide a measuring equipment which may be lowered into a well with or independently of other equipment. It may be left in the well for a long period of time so as to measure changes in a value or values during such period of time, or it may be lowered into a well with testing device so as to make possible the conducting of a number of different tests in the well and the immediate transmission of information or measures resulting from these tests to the surface, these informations or measures being then utilized in determining operations which are to be performed with relation to the well in order to obtain optimum results or best conditions of operation. For example, it is possible to make a number of tests in the region of the level at which an oil body is known to exist in order to make determinations as to water entry and to transmit the results of these tests immediately to the top of the well as the tests are made, thereby avoiding the necessity of withdrawing the device from the well after each test. The invention also makes possible the determination of both pressure and temperature at different times and under different conditions, these values being immediately utilizable in the control of further operations conducted with respect to the well.

The invention is described as embodied in apparatus operative to perforate the casing at a selected level, to close off the casing adjacent the perforations so as to hold back the pressure of mud or other fluid which may be present in the casing and thereby permit entry of fluid from the adjacent formation into the interior of the casing, and to measure or determine one or more conditions, including pressure and temperature, of the fluid which has entered the casing, this information being utilized in determining whether or not the formation should be placed on production.

A further object of the invention is to provide a device of the character set forth in the last preceding paragraph having simple, yet efficient electrical means for transmitting information or indications of the values of pressure and temperature to the top of the well.

Further objects and advantages of the invention may be brought out in the following part of the specification, wherein I have described a preferred embodiment of the invention in detail for the purpose of fully disclosing the same without limiting the invention defined in the appended claims.

Referring to the drawings which are for illustrative purposes only:

Fig. 1 is a schematic view showing a testing device including a preferred embodiment of my invention in a well casing with the packer set.

Fig. 2 is an enlarged sectional view of the upper portion of the testing device.

Fig. 3 is a sectional view of that portion of the device immediately below the portion shown in Fig. 2.

Fig. 4 is a sectional view of that portion of the device immediately below the portion shown in Fig. 3.

Fig. 5 is a sectional view of the device immediately below the portion shown in Fig. 4.

Fig. 6 is a partly sectioned view of the lower end of the device.

Fig. 7 is an enlarged sectional view of the pressure responsive unit and associated parts disclosed in the lower portion of Fig. 5.

Fig. 8 is a wiring diagram showing the electrical equipment employed in the practice of the invention hereinbefore described.

Fig. 9 is a diagram showing an alternative electrical apparatus which may be used in the practice of the invention.

Referring to Fig. 1, I have shown a device T including my new invention in a well casing 10. The device T is suspended by a string of tubing 11 which is threaded into a head 12 forming a part of the device T which includes also a packer 13, a receiving unit 14, and a perforating gun 15. As shown in Fig. 2, the head 12 is threaded onto the upper end of a hollow mandrel 16 which extends axially through the packer 13.

As shown in Figs. 2 and 3, the packer 13 has at its upper end a perforate sleeve 17 into which the head 12 projects. This sleeve 17 has threaded connection at 18 with the upper enlarged portion 20 of a packer body 19 which is hollow and includes a tubular member 21 carrying an assembly of packing rings 22 and spacer rings 23. At the lower end of the tubular member 21 there is an overlapping ring 24 which, prior to the setting of the packer 13, is connected to the tubular member 21 by a shear pin 25. The ring 24 threads into the upper end of a perforate tubular part 26 having at the lower end thereof tapered guides 27 in which jaws 28 are slidable. Pivot pins 29 at the lower ends of the jaws 28 are connected to links 30, the lower ends of which are connected by pins 31 to a ring 32 swivelly connected by a ring 33 with a sleeve 34 which carries bow springs 35 for frictionally engaging the inner surface of the casing 10. The lower end of the sleeve 34 is slidable on a tubular connector body 37 having threads 38 at its upper end, whereby it is connected to a sleeve 39 having threaded connection 40 with the lower end of the part 26. The sleeve 39 has near its upper and lower ends openings 41 and 42, and defines around the mandrel 16 an annular cavity 43 containing a cylindric sleeve valve 44 containing packing 45 for closing radial ports 46 in the lower portion of the mandrel 16. The sleeve 34 has a bayonet slot 47 therein which receives a projection on the connector body 37 consisting of the head of a screw 48 which threads into the body 37.

The lower end of the connector body 37 has threaded thereon a bushing 49 defining a downwardly faced cavity 50 which receives a threaded projection 51 extending upwardly from a fitting 52 which is connected by a threaded connection 53 to the lower end of the mandrel 16. The projection 51 of the fitting 52 has thereon a helical thread 54 of sawtooth form arranged to be engaged by the teeth or threads 55 of at least one body or slip 56 externally tapered so as to engage the inner tapered surface 57 of the bushing 49. The fitting 52 may be disengaged from the lower end of the connector member 37 by rotation of the fitting 52 so that the thread 54 will feed down out of engagement with the teeth or threads 55 of the slip or block 56. This rotation of the fitting 52 may be accomplished after the jaws 28 are set against the inner surface of the casing 10, by rotating the tubing 11, which rotation is transmitted through the head 12 to the mandrel 16 and by the mandrel 16 to the fitting 52.

The fitting 52 has a downwardly extending projection 58 which, as seen in Fig. 5, is threaded so as to receive the upper end of a cylindric receiving unit housing 59 having openings 60 therein. The receiving unit 14 occupies the chamber 61 within the housing 59. The lower end of the housing 59 is closed by a fitting 62 joined to the lower end of the housing 59 by a threaded connection 63. The fitting 62 has a downwardly extending threaded projection 64 for receiving the upper connection 65 of the perforating gun 15, schematically indicated as being of the type having a plurality of gun barrels 66 which carry projectiles 67.

The fitting 65 at the upper end of the gun 15 has therein a chamber 64 in which the electrical firing means 69 of the gun 15 is placed, this firing means having at its upper end a contact 70 which engages an electrical conductor 76 shown as a screw. The details of the firing means 69 are not shown for the reason that such firing means may be any of the known types. It may be adapted to fire all of the powder charges of the gun simultaneously or consecutively. In one use of the invention, it may be desired to fire all of the projectiles at the same time, while in another use of the invention, consecutive firing is employed in conjunction with a plurality of tests made in different localities in the well without the necessity of removing the testing device from the well.

As shown in Fig. 5, the receiving unit 14 comprises a cylindrical metal shell 77 having openings 78 near the upper end thereof. A plug 79 is fitted into the upper end of the cylindric shell 77, this plug 79 having an annular recess 80 covered by a flexible tubular wall 81 and communicating through openings 82 with a downwardly faced recess 83 in the plug 79. The lower end of the shell 77 is closed by a pressure responsive unit P having a cylindric shell 84, as shown in Fig. 7. The shell 84 has an upwardly faced recess 85 and a recess 86 of smaller diameter in the bottom of the recess 85. In the bottom of the recess 85 there is a circular insulator 87 supporting a U-shaped laminated iron core 88 having an inductance winding 89 on its legs. A plug 90 is threaded down into the recess 85. This plug 90 is in the form of an inverted cup and in turn has threaded upwardly thereinto a cup member 91, the transverse wall of which forms a diaphragm 92 which closes an air chamber 93 in the upper part of the plug 90. The plug 90 has flow limiting openings 94 therein for connecting the interior of the shell 77 with the lower part of the recess 85 and with the interior of the cup 91, so that the pressure within the shell 77 will be transmitted to the lower face of the diaphragm 92, thereby changing the space between the diaphragm 92 and the core 88 and thereby varying the inductance of the variable inductance L, which includes the core 88, the winding 89 and the armature formed by the diaphragm 92. The shell 84 has therein a passage 95 which connects the upper face of the shell 84 with the small recess 86 lying below the wall of insulating material 87.

Within the shell 77, between the plug 79 and the pressure responsive unit P, there is a condenser 96 which is bridged across the inductance winding 89 as shown in Fig. 8, by use of electrical connections which will be hereinafter described. Also, in the shell 77 there is a condenser 96' which is bridged across the inductance winding 89' associated with a temperature responsive means T. This temperature responsive means T is disposed in a depression or recess 80' in the lower cylindrical wall portion of the plug 79 which closes the upper end of the shell 77. The temperature responsive means T has a part 94' which extends within the interior space defined by the lower portion of the plug 79 and supports an iron armature 92' in movable relation to the ends of the legs of a U-shaped core 88' on which the coil 89' is wound.

The winding 89' is connected by a conductor 97 with a screw 167 which, as will be hereinafter described, forms a portion of a conductor means 119 which extends to the top of the well to connect with oscillators O and O'. A conductor 101 connects the lower terminal of the winding 89' with one terminal of the winding 89. Conductors 98a and 98b are employed to bridge the condenser 96 across the winding 89, and conductors 98c and 98d are employed to bridge the condenser 96' across the winding 89'. In this manner, resonant circuits C and C' are formed. As shown in Fig. 7, one terminal of the winding 89 is connected to a terminal 99 which is in turn connected by a conductor 101a with a screw 100. The screw 100 is connected to the conductor 98b.

All of the internal spaces of the receiving unit 14, with the exception of the air chamber 93, are filled with an insulating liquid such as transformer oil. This body of liquid engages the inner face of the flexible wall 81 and external pressures applied to the flexible wall 81 are transmitted to the insulating liquid body, and through this liquid body, are transmitted to the lower face of the armature 92 to flex the same away from the iron core 88 of the inductance L. The inductance L in conjunction with the condenser 96 forms a resonant circuit C which will oscillate when energized. The frequency of oscillation produced in the resonant circuit C is determined by the position of the armature 92 with relation to the iron core 88. At the top of the well I place thermionic oscillation generators O and O' which in the present practice of the invention are single-ended oscillators and are connected in circuit with the resonant circuits C and C' by conductor means 119 which is composed of a plurality of electro-conductive parts, as will hereinafter be described, and a ground connection 123 as shown in Fig. 1.

As shown in Figs. 1 and 2, the conductor means 119 comprises an insulated armored cable 140 having on the lower end thereof a weighted member or sinker 141 comprising an axially bored bar 142 through which an insulated conductor 143 extends. The sinker 141 has at its upper and lower ends connector means 144 and 145 which are connected by the conductor 143. The connector means 144 comprises a metal socket 145a adapted to receive a connector pin 146 which is connected to the lower end of the cable 140 and projects downwardly from a body 147 which is detachably connected to the upper end of the sinker 141. This body 147 extends into a recess 148 in the upper end of the sinker 141, and has a shoulder 149 engaged by a shear pin 150. Should the sinker 141 become stuck in the tubing 11, the cable 140 may be detached from the sinker 141 by exerting a heavy upward pull thereon to shear the pin 150.

The conductor means 119 further comprises the metal socket 145b supported at the lower end of the sinker 141 and adapted to receive an upwardly projecting connector pin 151 disposed in a recess 152 in the head 12 of the testing device. Offset from the axis of the head 12, there is a passage 153 which connects the interior of the tubing 11 with the interior of the mandrel 16, this passage having therein a flow bean 154. The continuation of the conductor means 119 down through the device utilizes a connector pin 155 which is projected downwardly within the axial opening 156 in the head 12. This connector pin 155 is electrically connected to the pin 151 by the metal parts shown, and, in keeping with the rest of the formation of the conductor means 119, the electric current conducting parts are fully insulated from other metal parts of the testing device by insulator bodies which are so clearly shown as not to require detailed description. From the connector pin 155, the conductor means 119 is carried down the mandrel 16 by an insulated conductor 157 supported by a tube 158 which extends through the axial opening of the mandrel 16. The upper end of the tube 158 has threaded connection 159 with the head 12 so that it is suspended within the axial opening of the mandrel 16. At the upper end of the tube 158 there is a connector socket 160 which is connected to the upper end of the conductor 157 and engages the connector pin 155. At the lower end of the tube 158, as shown in Fig. 4, a connector socket 161 is supported so that it will engage a connector pin 162 carried by the fitting 52 so that connection will be made between the parts 161 and 162 when the fitting 52 is screwed onto the lower end of the mandrel 16. In a recess 163, Fig. 5, in the lower end of the fitting 52 there is a downwardly faced connector pin 164 electrically connected to the pin 162 by parts 165. This connector pin 164 is adapted to engage a connector socket 166 supported in the plug 79 of the receiving unit 14 in projecting relation thereto. A metal screw 167 extends from the connector socket 166 into the recess 83 for connection to the conductor 97, as shown in Fig. 5. At the lower end of the shell 77, supported by the part 84, and engaged by the screw 100, there is a connector socket 166' similar to the socket 166, this socket 166' projecting into a recess 168 in the upper end of the fitting 62, for engagement with an inwardly projecting connector pin 169 disposed in the recess 168, whereby the conductor 98b, and the terminal 99, may be connected to the conductor element 76, shown as a screw, which extends axially through the fitting 62 for the purpose of carrying the electrical circuit to the electrical firing device 69 of the perforating gun 15. Sealing means, such as rings 170, 171, 172 and 173, are employed, where required, to prevent access of water or other fluids to the electrical connections which would otherwise be exposed.

As shown in the electrical diagram, Fig. 8, the oscillation generator O includes triodes 103 and 104, the cathodes 105 and 106 of which are connected through a ground conductor 107, and a switch S, with the negative pole of a battery 108. The positive pole of the battery 108 is connected through a resistor 109' to a conductor 109 which connects the plate 110 of the triode 103 and with a condenser 111. A conductor 112 connects the positive pole of the battery 108 through a resistance 113 with the plate 114 of the triode 104. The grid 115 of the triode 103 is connected through a condenser 116 with the plate 114 of the triode 104, and the grid 115 is also connected to the negative pole of the battery 108 through the resistance 117 and a condenser 118 disposed in parallel relation. The condenser 111 is connected through a high pass filter 71 to the conductor means 119, which includes parts extending down through the tubing 11 and the interior of the device supported by the tubing 11 with the well, in insulated relation thereto, as has been hereinbefore explained, so as to make connection with the condenser 96 and the winding 89. The grid 120 of the triode 104 is connected through a resistance 121 with the ground conductor 107 and is connected through a condenser 122 with the conductor means 119. The connection of the oscillation generator O with the resonant circuit C is completed by use of a conductor means 123 which may be ground and is preferably connected, as shown in Fig. 1, to the upper end of the casing 10 and/or the upper end of the tubing 11. The condenser 96 and the winding 89 of the inductance L have grounded connection through the resistance 99a and the gun firing mechanism 69, thereby bringing the resonant circuit C into operative electrical connection with the oscillation generator O.

A frequency meter 124 is bridged across the conductors 107 and 109 and is therefore placed in frequency-measuring relation to the resonant circuit C and acts to measure the frequency of the oscillations at any time existing in this resonant circuit. The position of the armature 92 varies in accordance with the well pressure. As the well pressure varies, the position of the armature 92 will vary so as to change the flux concentration of the inductance L, thereby varying the frequency characteristics of the oscillating circuit C in proportion to the changes in pressure in the well. The frequency member 124 may be calibrated so as to indicate frequency of oscillations in the circuit to which it is connected, or it may be calibrated so as to directly indicate pressures to which the diaphragm 92 is exposed.

As shown in Figs. 1 and 8, there is at the upper end of the well an oscillation generator O' which is similar in all respects to the oscillation generator O, with the exception that it is adapted to oscillate within a lower frequency range, and is connected to the conductor 119 through a low pass filter 71' instead of through the high pass filter 71. In view of its similarity to the oscillation generator O, the oscillation generator O' is not described in detail, but the elements thereof which have previously appeared in the oscillation generator O have been indicated by the numerals employed in oscillation generator O with prime marks applied thereto. The oscillation generator O' cooperates with the resonant circuit C' which is tuned to respond to a lower frequency than the resonant circuit C. When the oscillation generator O' is energized, as a result of the closing of its switch S', the resonant circuit C' will be energized and will produce oscillations having a frequency determined by the position of the armature 92' which is controlled by the temperature responsive element T.

As schematically indicated in Fig. 8, the conductor means 119 is electrically connected through the windings 89' and 89 with the electrical ignition control means 69 of the gun 15. For actuation of the device, I provide at the top of the well a source of electrical current of sufficiently high voltage and amperage, shown as a battery 131, one terminal of which is connected through a conductor 132 with the ground conductor 123. A conductor 133 is extended from the conductor means 119 and by closing of a switch 134, this conductor 133 may be connected directly to the battery 131, thereby applying to the circuit which extends into the well a heavy current which will cause incandescence of the filament 128 and the ignition of the powder charge of the fuse 74. For testing the circuit extended into the well, a switch 135 may be closed so as to connect the conductor 133 with the battery through a resistor 136 and a meter 137. If the firing or ignition device 69 of the gun 15 includes a fuse in series with the conductor means 119, the test made by the closing of the switch 135 will indicate whether or not this fuse has been ruptured.

Where the resonant circuits C and C' are employed as shown in series with the gun firing device, and with each other, instead of in parallel, the capacitor 96' of the low frequency resonant circuit C' is provided with a capacitance of such large value that it will transmit or pass the high frequency wave corresponding to the frequency of the resonant circuit C, and the choke 89 of the high frequency resonant circuit C will be provided with such low inductance that it will pass the low frequency alternations corresponding to the low resonant frequency of the resonant circuit C'. The high and low frequency oscillations from the oscillators O and O' will pass through the circuit and electrical devices which are lowered into the well, but they will cause only the resonant circuits C and C' of corresponding resonance to resonate. The high and low pass filters 71 and 71' guard the oscillators O and O' against frequencies outside the frequency ranges in which they are designed to operate.

In one important use of the invention, the tester T is lowered down into the well casing 10 through the liquid content thereof by use of the tubing 11. Periodically during the descent of the tester T, the cable 140 and the sinker 141 may be lowered through the tubing so as to connect the conductor of the cable 140 with the connection pin 151. When this is done, test switch 135, Fig. 8, may be closed, and the meter 137 may be observed to determine whether the conducting means 119 is completely connected through electrical equipment of the testing device T. Also, the oscillation generators O and O' may be selectively actuated so as to obtain readings of a liquid pressure and/or temperature at desired levels in the well. When the testing device T has been lowered so as to bring the perforating gun 15 to the level selected for the testing operation, the cable 140 and the sinker 141 may be again lowered into the tubing to make connection with the connector pin 151. Thereupon, the oscillation generators O and O' may be actuated so as to determine the pressure and temperature existing at the level of the receiving unit 14.

After the foregoing information is obtained, the perforating gun 15 may be fired by closing the switch 134. If the oscillation generator O is in operation at the time the perforating gun is fired, the impulse applied to the diaphragm 92 of the pressure responsive means in the well will be indicated by a deflection of the pointer of the meter 124, thereby performing one of the valuable functions of the electrical equipment of the invention, that of definitely indicating at the top of the well the firing of the gun 15.

As soon as the gun is fired, the packer may be actuated. This actuation of the packer 13 is accomplished by rotating the upper end of the tubing 11 so as to rotate the packer body 19 with relation to the sleeve 34 so as to carry the projection 48 into alignment with the vertical portion of the bayonet slot 47. Whereupon the packer body may be lowered so as to move the tapered guides 27 downward with relation to the jaws 28, thereby forcing the jaws 28 out against the casing. When the jaws 28 have been set, the tubing 11 may be rotated so as to turn the mandrel 16 with relation to the packer body and screw the thread 54 of the fitting 52 downward out of engagement with the member 56. Then, the tubing 11 may be lowered so as to carry the head 12 downward within the perforate sleeve 17 into engagement with the seat 17' in the upper end of the upper portion 20 of the packer body. Sufficient of the weight of the tubing may be applied to the parts 20 and 21 of the packer to shear the pin 25, whereupon the shoulder a of the member 20 may be moved downwardly with relation to the shoulder b at the upper end of the member 24, to compress the packing rings 22 axially and thereby expend them out into engagement with the inner surface of the casing 10, as shown in Fig. 1.

When the mandrel is moved downward, as explained in the foregoing, the ports 46 thereof will be displaced downward, as shown in Fig. 1, into a position below the valve 44, thereby opening the interior space of the mandrel 16 to communication with the interior of the casing 10 below the packer, so that there may be a flow of fluid from the casing below the packer up through the mandrel 16 and through the passage 153 of the head 12 into the lower end of the tubing 11. This flow of fluid into the tubing 11 reduces the fluid pressure in the well casing below the packer 13 and permits fluid to enter the casing from the surrounding formation, through the perforations p made by the passage of the projectiles 175 fired from the perforating gun 15, provided, of course, that there is fluid under pressure in the adjacent formation. Ordinarily, the next step in the practice of the invention is to shut off the flow from the upper end of the tubing 11 and to then operate the oscillation generator O so as to obtain knowledge from the meter 124 thereof and information of the static formation pressure applied to the fluid which has entered the casing 10 below the packer 13. This information may be supplemented by readings of pressure and temperature taken after the flow from the adjacent formation into the casing has been resumed so as to make determinations as to the capacity of the formation. Pressure changes resulting in the space below the packer from changes in rate of flow may be noted and compared with other pressure records obtained. If the volume and the pressure of the oil encountered in the adjacent formation are sufficient, a flow of oil will be produced through the tubing 11, thereby bringing to the operator at the top of the well knowledge of the fluid content of the formation. If such flow through the tubing is not accomplished, pressure readings may be taken and a sample taken by raising the tubing 11 to shift the mandrel upward from the position thereof shown in Fig. 1 to the position thereof shown in Fig. 4, bringing the ports 46 of the mandrel 16 into the cylindric valve 44 so as to close the lower end of a mandrel 16 and trap within the mandrel, and also within the lower part of the tubing 11, a sample of fluid to be carried to the surface for inspection.

In Fig. 9 I show resonant circuits R and R' of like characteristics adapted to be substituted for the resonant circuits C and C' of Fig. 8, these resonant circuits R and R' respectively having variable inductances 89a and 89b adapted to be varied respectively by pressure and temperature in the well as a result of movement of armatures 92 and 92' in accordance with the teachings of the foregoing specification. These resonators or resonant circuits R and R' are connected to ground and to conductor means 119b which extends from within the well to the surface and is connected through a condenser 175 with an oscillation generator or single-ended oscillator G of the type described in Fig. 8. The oscillation generator G is grounded through a conductor 123a and a direct current potential, shown as a battery 176, is connected across the ground conductor 123a and the conductor means 119b through a polarity reversing switch 177 and a choke coil 178 which will inhibit passage of oscillations from the oscillation generator G through the battery 176 to ground. The lower end of the conductor means 119b is connected to the resonant circuits R and R' through valves shown as rectifiers 180 and 180a positioned as shown. A frequency meter 181 is connected to the oscillation generator G, this frequency meter having a pointer 182 which will swing in one direction from center, for example, rightward, in response to a positive flow of current therethrough and which pointer will swing leftward from center in response to a negative flow of current therethrough. The polarity reversing switch 177 is shown as of drum type, having a pair of substantially semi-circular contacts 183 and 184 which may be continuously rotated around a common center so as to periodically reverse the polarity of the direct current applied by the battery 176 to the circuit which includes the oscillation generator G. When the positive polarity of the current from the battery 176 is applied through the conductor means 119b, current will flow through the resonant circuit R' and the resonant circuit R will be inactive. At this time, therefore, the frequency of oscillation of the circuit energized by the oscillation generator G will be determined by the frequency characteristics of the resonant circuit R', and the needle or pointer 182 of the frequency meter 181 will swing to the right to a position indicating temperature in the well. When negative polarity of the battery 176 is applied to the conductor means 119b, current will pass through the resonant circuit R, but not through the resonant circuit R', and the needle or pointer 182 of the frequency meter 181 will swing to the left to indicate pressure in the well. If the circular contacts 183 and 184 of the polarity reversing switch 177 are revolved around their common center at a rate of 30 revolutions per minute, the resonators R and R' will be respectively energized during alternate seconds and therefore a stylus 190 carried by the pointer 182, will inscribe on a moving record 30 pressure indications 192 and 30 temperature indications 193 per minute so that for all practical purposes, a substantially continuous record of pressure and temperature is obtained by use of a single oscillation generator G. It will be understood that the polarity reversing switch 177 may be stopped in a position to impress either positive or negative polarity on the conductor means 119b so that at this time only one of the measurements of temperature or pressure in the portion of the well below the packer 13 is obtained.

In certain periods, or at certain times during the forming of a well, the well contains liquid. During drilling operations, for example, the uncased hole and also the cased portions of the hole may contain heavy drilling mud which exerts a static pressure to hold back fluids which exist under pressure in the formations. In my present invention I provide a method and means whereby a portion of the well is closed off from adjacent portions and a path of flow for fluid is established from the closed off portion to a zone of low pressure, for example, the open atmosphere at the top of the well. In correlated or timed relation thereto, tests of pressure and temperature, or either of them, as conditions may require, are made, thereby giving the operator valuable information. The close-off means, for example, the packer, holds the pressure of the liquid in the well, for example, drilling mud, water, oil, or mixtures thereof, off from the closed-off portion of the well. The establishment of a path of flow from the closed off portion of the well to the surface, for example, by opening the valve ports 46, Fig. 4, will provide a means for relieving pressure from the closed off portion of the well which will result in a pressure drop in the closed off portion. The present invention permits or provides for the taking of pressure and/or temperature measurements in the closed off portion in a known relation or timed relation to the establishing of the path of flow to the exterior. For example, the measuring instruments which have their pressure and temperature responsive elements exposed to conditions in the closed off portion of the well are placed in operation at a time prior to the operation of the close-off means so that the operator at the top of the well may take readings of pressure and temperature existing in the drilling mud or other liquid which occupies the well. Then, when the close-off means is actuated, the continued measurements indicated by the apparatus indicate that the same pressure and temperature may exist in the portion of the well below the close-off means which existed prior to the operation of the close-off means. When the path of flow from the close-off portion of the well to the exterior is established, a drop in pressure in the closed off portion of the well will be registered in timed relation to the establishment of the path of flow from the closed-off portion to the exterior, for the reason that fluid under pressure in the closed off portion of the well passes into the path of flow provided by the tubing 11.

If there is no movement of fluid under pressure into the closed off portion of the well, the pressure therein will drop to a characteristic value and remain there. But, if there is an entry of fluid from the adjacent formation into the closed off portion, the level of fluid in the path of flow, represented by the tubing 11, will rise, and there will be an increase, or at times, abrupt increase in the pressure in the closed off portion, and under some conditions, there will be a change in temperature in the closed off portion. If the pressure in the adjacent formation is sufficient, fluid will be caused to flow from the upper end of the tubing 11, and in order to obtain a measurement of the maximum pressure of which the adjacent formation is capable, the upper end of the tubing 11 may be shut off or restricted, thereby making it possible to obtain a reading of the maximum formation pressure. However, if at the time the path of flow is established from the closed off portion to the top of the well, the inlet openings of such path of flow should become clogged, as, for example, by drilling mud or materials from the formation, a drop in pressure in the closed off portion of the well will not occur, thereby indicating there has not been a release of pressure resulting from the establishment of the path of flow, and that interference to flow of fluid through the path of flow has been encountered. This brings to the operator the knowledge that the high pressure then existing in the closed off portion is not representative of the formation characteristics. An important characteristic of the invention is that the pressure and temperature measurements are transmitted instantly to the top of the well so that the changes in these values, with relation to other acts are known to the operator at the times of their occurrence, thereby bringing to him knowledge of well conditions of dependable character. Also, it will be perceived that these valuable functions of the invention are obtainable independently of the perforating gun, since they involve only the use of the packer or other equivalent means for closing off a portion of the well and means for substantially instantaneously transmitting measurements of either or both pressure and temperature from the closed off portion of the well to the top of the well.

I claim as my invention:

1. In a device for measuring pressure and temperature in a well: a supporting member adapted to be lowered into the well; first and second resonant circuits carried by said supporting member, each of said circuits comprising a capacitor and a variable inductor and said resonant circuits being tuned so as to operate in different frequency bands; pressure responsive means arranged to vary the inductor of said first resonant circuit in accordance with changes in pressure to which said pressure responsive means is subjected; temperature responsive means arranged to vary the inductor of said second resonant circuit in accordance with changes in temperature to which said temperature responsive means is subjected; conductor means extending down into the well to said supporting member so as to form a transmission circuit means connected at its lower end to said first and second resonant circuit; means operative to supply electrical impulses to energize said resonant circuits and effect oscillating current flows in said resonant circuits and said transmission circuit means, said oscillating current flows being varied by varying said inductors of said resonant circuits; filters at the top of the well tuned to said different frequency bands; and indicating means at the top of the well connected respectively through said filters with said circuit means, said indicating means being responsive to said oscillating current flows to indicate respectively pressures and temperatures to which said pressure responsive means and said temperature responsive means are subjected in the well.

2. In a device for measuring pressure and temperature in a well: a supporting member adapted to be lowered into the well; first and second resonant circuits carried by said supporting member, each of said circuits comprising a capacitor and a variable inductor and said resonant circuits being tuned so as to operate in different frequency bands; pressure responsive means arranged to vary the inductor of said first resonant circuit in accordance with changes in pressure to which said pressure responsive means is subjected; temperature responsive means arranged to vary the inductor of said second resonant circuit in accordance with changes in temperature to which said temperature responsive means is subjected; conductor means extending down into the well to said supporting member so as to form a transmission circuit means connected at its lower end to said first and second resonant circuit; filters at the top of the well tuned to said different frequency bands; a pair of oscillation generators at the top of the well connected respectively through said filters with said circuit means, said generators energizing said resonant circuits and effecting oscillating current flows in said resonant circuits and said transmission circuit means, which oscillating current flows vary in accordance with the variation of said variable inductors; and indicating means at the top of the well connected respectively through said filters with said circuit means, said indicating means being responsive to said oscillating current flows to indicate respectively pressures and temperatures to which said pressure responsive means and said temperature responsive means are subjected in the well.

3. In a device for measuring pressure and temperature in a well: a supporting member adapted to be lowered into the well; first and second resonant circuits carried by said supporting member, each of said circuits comprising a capacitor and a variable inductor; pressure responsive means arranged to vary the inductor of said first resonant circuit in accordance with changes in pressure to which said pressure responsive means is subjected; temperature responsive means arranged to vary the inductor of said second resonant circuit in accordance with changes in temperature to which said temperature responsive means is subjected; conductor means extending down into the well to said supporting member so as to form a transmission circuit means connected at its lower end to said first and second resonant circuit;

means for polarizing said resonant circuits to opposite polarities; means operative to supply oppositely polarized electrical impulses to energize said resonant circuits and effect oscillating current flows in said resonant circuits and said transmission circuit means, said oscillating current flows being varied by varying said inductors of said resonant circuits; and indicating means at the top of the well connected through said circuit means with said first and second resonant circuits, said indicating means being responsive to said oscillating current flows to indicate respectively pressures and temperatures to which said pressure responsive means and said temperature responsive means are subjected in the well.

4. In a device for measuring pressure and temperature in a well: a supporting member adapted to be lowered into the well; first and second resonant circuits carried by said supporting member, each of said circuits comprising a capacitor and a variable inductor; pressure responsive means arranged to vary the inductor of said first resonant circuit in accordance with changes in pressure to which said pressure responsive means is subjected; temperature responsive means arranged to vary the inductor of said second resonant circuit in accordance with changes in temperature to which said temperature responsive means is subjected; conductor means extending down into the well to said supporting member so as to form a transmission circuit means connected at its lower end to said first and second resonant circuit; means for polarizing said resonant circuits to opposite polarities comprising oppositely faced rectifiers connected respectively in series with said resonant circuits; means comprising an electrical pulsation generator and means operating to alternately apply to said transmission circuit direct current flows of opposite polarity operative to supply oppositely polarized electrical impulses to energize said resonant circuits and effect oscillating current flows in said resonant circuits and said transmission circuit means, said oscillating current flows being varied by varying said inductors of said resonant circuits; and indicating means at the top of the well connected through said circuit means with said first and second resonant circuits, said indicating means being responsive to said oscillating current flows to indicate respectively pressures and temperatures to which said pressure responsive means and said temperature responsive means are subjected in the well.

5. In a device for measuring a condition in a well: a supporting member adapted to be lowered into a well; a resonant circuit carried by said supporting member, said resonant circuit comprising a capacitor and a variable inductor; means acting in response to a condition in the well to vary said inductor in accordance with variations of said condition; conductor means extending down into the well from the top thereof to said resonant circuit and being connected therewith so as to form a transmission circuit; means operative to supply electrical impulses to energize said resonant circuit and effect oscillating current flows in said resonant circuit and said transmission circuit, which oscillating current flows will vary in accordance with the variation of said inductor by said condition; and indicating means at the top of the well connected to the upper end of said transmission circuit, said indicating means being adapted to respond to said oscillating current flows and indicate the value thereof as a measure of said condition.

6. In a device for measuring a condition in a well: a supporting member adapted to be lowered into a well; a resonant circuit carried by said supporting member, said resonant circuit comprising a capacitor and a variable inductor; means acting in response to a condition in the well to vary said inductor in accordance with variations of said condition; conductor means extending down into the well from the top thereof to said resonant circuit and being connected therewith so as to form a transmission circuit; an oscillation generator at the top of the well connected to the upper end of said transmission circuit and being operative to supply electrical impulses to energize said resonant circuit and effect oscillating current flows in said resonant circuit and said transmission circuit, which oscillating current flows will vary in accordance with the variation of said inductor by said condition; and indicating means at the top of the well connected to the upper end of said transmission circuit, said indicating means being adapted to respond to said oscillating current flows and indicate the value thereof as a measure of said condition.

7. In a device for measuring a condition in a well: a supporting member adapted to be lowered into a well; a resonant circuit carried by said supporting member, said resonant circuit comprising a capacitor and a variable inductor; means acting in response to a condition in the well to vary said inductor in accordance with variations of said condition; conductor means extending down into the well from the top thereof to said resonant circuit and being connected therewith so as to form a transmission circuit; an oscillation generator at the top of the well connected to the upper end of said transmission circuit and being operative to supply electrical impulses to energize said resonant circuit and effect oscillating current flows in said resonant circuit and said transmission circuit, which oscillating current flows will vary in accordance with the variation of said inductor by said condition; and the meter at the top of the well connected in parallel with said oscillation generator and said transmission circuit, said meter responding to said oscillating current flows and indicating the value thereof as a measure of said condition.

PHILIP W. MARTIN.

REFERENCES CITED

The following references are of record in the file of this patent:

UNITED STATES PATENTS

| Number | Name | Date |
| --- | --- | --- |
| 1,951,276 | Edwards | Mar. 13, 1934 |
| 2,190,260 | Ennis | Feb. 13, 1940 |
| 2,222,829 | Humason et al. | Nov. 26, 1940 |
| 2,245,700 | Mounce | June 17, 1941 |
| 2,280,785 | Boynton | Apr. 28, 1942 |
| 2,313,369 | Spencer | Mar. 9, 1943 |
| 2,330,509 | McCullough | Sept. 28, 1943 |
| 2,412,575 | Frosch | Dec. 17, 1946 |
| 2,421,423 | Krasnow | June 3, 1947 |
| 2,425,868 | Dillon | Aug. 19, 1947 |
| 2,441,894 | Mennecier | May 18, 1948 |
| 2,530,309 | Martin | Nov. 14, 1950 |